United States Patent [19]

Kim

[11] Patent Number: 5,572,501
[45] Date of Patent: Nov. 5, 1996

[54] OPTICAL PICKUP ACTUATOR FOCUS CONTROL WITH REFERENCE TO A FOCUS ZERO DETECTION SIGNAL AND A FOCUS SERVO DRIVE ZERO DETECTION SIGNAL

[75] Inventor: Goonjin Kim, Seoul, Rep. of Korea

[73] Assignee: Daewoo Electronics Co., Ltd., Seoul, Rep. of Korea

[21] Appl. No.: 361,647

[22] Filed: Dec. 22, 1994

[30] Foreign Application Priority Data

Dec. 24, 1993 [KR] Rep. of Korea ...................... 93-29443

[51] Int. Cl.$^6$ .................................................. G11B 7/00
[52] U.S. Cl. ...................... 369/112; 369/124; 369/44.32; 369/44.35; 250/201.5
[58] Field of Search .......................... 369/44.29, 44.35, 369/32, 44.32, 54, 44.25, 112, 58, 124, 44.36; 250/201.5

[56] References Cited

U.S. PATENT DOCUMENTS 4,891,798  1/1990  Shinkai ........................ 369/43
5,172,354  12/1992  Otsubo ....................... 369/44.27
5,399,849  3/1995  Jung ............................ 369/44.36
5,459,309  10/1995  Kagami et al. .............. 250/201.5

Primary Examiner—Georgia Y. Epps
Assistant Examiner—Kim-Kwok Chu
Attorney, Agent, or Firm—Oliff & Berridge

[57] ABSTRACT

Disclosed is a focus servo circuit for an optical pickup actuator capable of performing a normal focusing operation accurately and fast with detecting predetermined regions of a focus error signal and focus servo drive signal. The circuit has a focus zero detection unit for generating a focus zero detection signal with a detection of a predetermined region including a zero crossing from the focus error signal, a drive signal zero detection unit for generating a focus servo drive zero detection signal with a detection of a predetermined region including a zero crossing from the focus error signal and a unit for controlling the focus start enable signal thereby to start a focus servo of the optical pickup actuator with reference to both of the focus zero detection signal and the focus servo drive zero detection signal.

3 Claims, 5 Drawing Sheets

OPTICAL PICKUP ACTUATOR FOCUS CONTROL WITH REFERENCE TO A FOCUS ZERO DETECTION SIGNAL AND A FOCUS SERVO DRIVE ZERO DETECTION SIGNAL

BACKGROUND OF THE INVENTION

1. Field of the Invention

The present invention relates to a servo device for an optical actuator in an optical disc player, more particularly to a focus servo circuit for an optical pickup actuator in an optical disc player.

2. Description of the Prior Art

In general, an optical disc player for playing back an optical disc such as a mini disc or a compact disc employs an optical pickup device for exactly reading information recorded on the optical disc. Such an optical pickup device has an optical pickup actuator equipped with an objective lens. The optical pickup actuator is controlled by a servo device therefor. According to a control of the servo device, the optical pickup actuator performs a focusing operation and a tracking operation. The objective lens of the optical pickup actuator moves up and down by the focusing operation of the optical pickup actuator.

FIG. 1 is a schematic view for explaining a flow of a laser beam from a generation of the laser beam to outputs of currents for controlling tracking and focusing operations of a servo device. As shown in FIG. 1, a laser beam generated from a laser diode 150 reaches a half mirror 154 through a grating lens 152. The laser beam which has reached half mirror 154 is irradiated on an optical disc 156 through an objective lens 66 of an optical actuator. The laser beam irradiated on optical disc 156 is reflected to half mirror 154 through objective lens 66 again. A part of the laser beam reflected from half mirror 154 is irradiated on a photo diode 10.

At this time, photo diode 10 outputs an electrical signal $I_P$ according to the laser beam irradiated thereon. Electrical signal $I_P$ is inputted to a servo device 160 for an optical pickup actuator. Servo device 160 outputs tracking and focusing control currents $I_t$ and $I_f$ according to electrical signal $I_P$ inputted thereto. Currents $I_t$ and $I_f$ are applied to a tracking coil and focusing coil (not shown) of the optical actuator, so that the tracking and focusing operations are controlled by currents $I_t$ and $I_f$.

FIG. 2 is a block diagram for illustrating a conventional focus servo circuit for an optical pickup actuator. As shown in FIG. 2, the laser beam reaches photo diode 10 through optical disc 156 and objective lens 66. Photo diode 10 is divided into 4 regions A, B, C, and D. When electric power is applied to the optical disc player, a focus servo circuit 163 of an optical pickup actuator 8 outputs a focus servo start signal with a microprocessor 5 operating. The focus servo start signal is applied to a focus servo drive unit 7 of optical pickup actuator 8 by a control of a switching unit 6 through a switching control unit 165. Therefore, optical pickup actuator 8 performs the focusing operation of moving objective lens 66 up and down. Such up and down movements of objective lens 66 are detected by photo diode 10 thereby outputting a focus error signal FE. Focus error signal FE is inputted to switching control unit 165 which detects a zero crossing of focus error signal FE. Since objective lens 66 can be linearly controlled in a predetermined period section of focus error signal FE when the zero crossing is detected, switching control unit 165 cuts off outputting the focus servo start signal and enables focus error signal FE from photo diode 10 to be applied to a focus error detector 11. Therefore, focus servo circuit 163 performs a normal focusing operation for optical pickup actuator 8 following the detection of the zero crossing of focus error signal FE.

As mentioned above, in a conventional focus servo circuit for an optical pickup actuator, since a normal focusing operation is started after a detection of a zero crossing, there exit drawbacks in that a normal focusing operation is delayed since a normal focusing operation is started after a detection of a zero crossing and in that a normal focusing operation may be started by a focus error signal caused by disturbance abruptly occurring from the outside.

SUMMARY OF THE INVENTION

It is an object of the present invention to provide a focus servo circuit for an optical pickup actuator capable of performing a normal focusing operation accurately and fast while detecting predetermined sections of a focus error signal and a focus servo drive signal.

To achieve the above object, a focus servo circuit according to the present invention comprises:

a control unit for outputting a focus start signal and a focus start enable signal;

a focus error detection unit for generating a focus error signal in accordance with a focus error of an objective lens which is generated by the focus start signal and the focus start enable signal;

a compensation unit for outputting a focus servo drive signal in compensation of the focus error signal;

a focus servo drive unit for performing a focusing operation with an input of the focus servo drive signal;

a focus zero detection unit for generating a focus zero detection signal with a detection of a predetermined region including a zero crossing from the focus error signal;

a drive signal zero detection unit for generating a focus servo drive zero detection signal with a detection of a predetermined region including a zero crossing from the focus error signal; and means for controlling the focus start enable signal thereby to start a focus servo of the optical pickup actuator with reference to both of the focus zero detection signal and the focus servo drive zero detection signal.

In the focus servo circuit according to the present invention, when electric power is applied to the optical disc player and then a playback button is pressed or a disc loading is sensed, the control unit outputs the focus start signal. The focus start signal is transformed to the focus servo drive signal which is inputted into the focus servo drive unit. The focus servo drive signal forces the objective lens to move up and down. The up-and-down movements of the objective lens cause the photo diode to generate the focus error signal. The focus zero detection unit detects a predetermined section of the focus error signal, and the drive signal zero detection detects a predetermined section of the focus servo drive signal. The predetermined section is a portion of an S-curve of the focus error signal, and the S-curve is well-known to those skilled in the art as the portion of focus error signal which is outputted in a linear relationship with displacements of the optical pickup actuator. Therefore, the predetermined section is a section that stably ensures a linear relationship in an output of the focus error signal according to the up-and-down displacements of the optical pickup actuator. The predetermined section is a portion of the focus servo drive signal, and the portion ensures stable and linear displacements of the optical pickup actuator when starting a focus servo. Therefore, the predetermined section is a section that stably secures a linear relationship between the focus servo drive signal FSS and the displacements of the optical pickup actuator. The focus servo circuit for an optical pickup actuator enables accurate and fast focus servo to be performed since the predetermined sections of the focus error signal and the focus servo drive signal are simultaneously referred together to control the focus servo.

BRIEF DESCRIPTION OF THE DRAWINGS

The above objects and other advantages of the present invention will become more apparent by describing in detail a preferred embodiment thereof with reference to the attached drawings in which.

DESCRIPTION OF THE PREFERRED EMBODIMENT

A focus servo circuit for an optical pickup actuator according to an embodiment of the present invention will be described below in detail with reference to the accompanying drawings.

Figure 1:
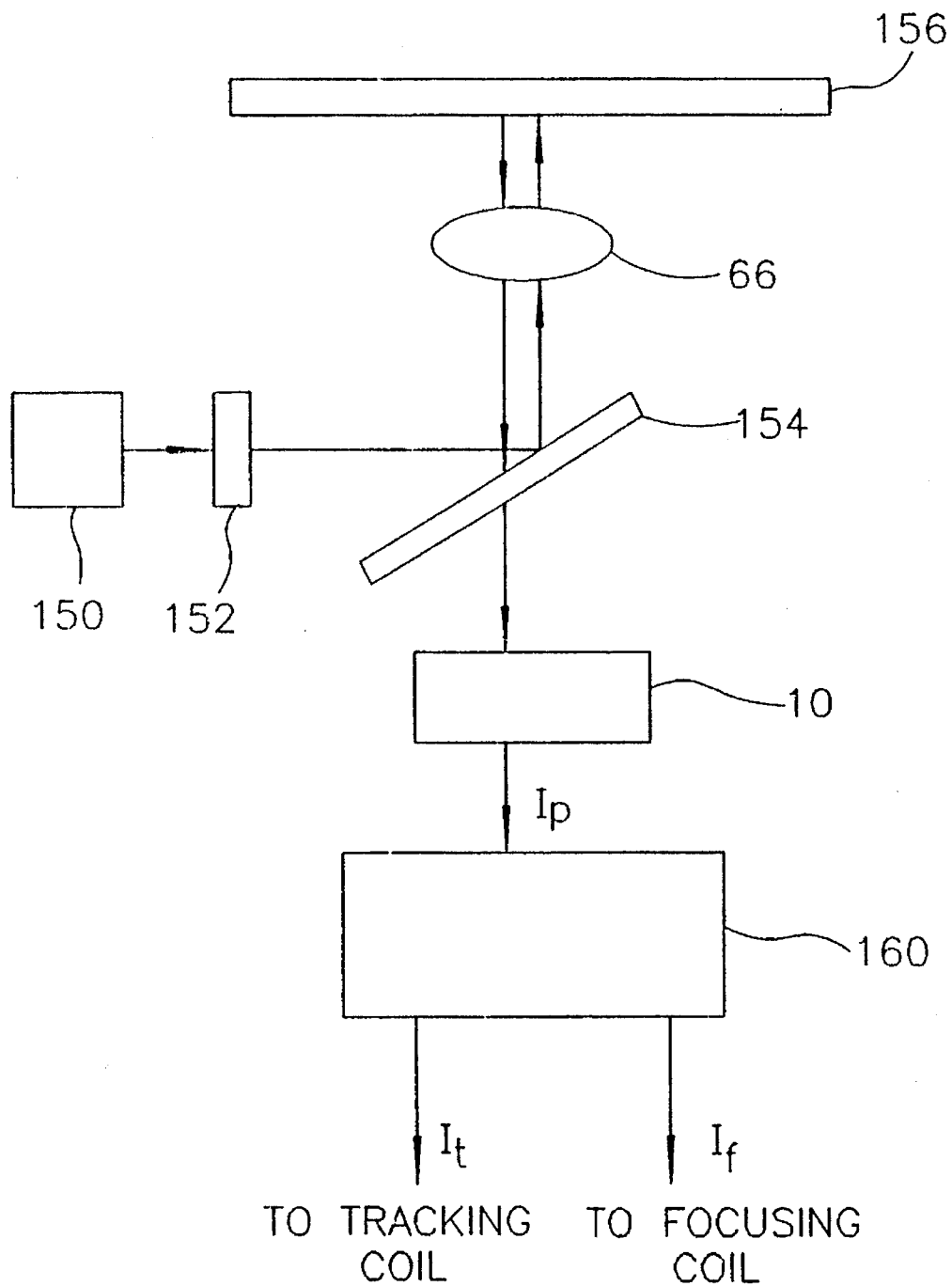
FIG. 1 is a schematic view for explaining a flow of a laser beam from a generation of the laser beam to outputs of currents for controlling tracking and focusing operations of a servo device.
Figure 2:
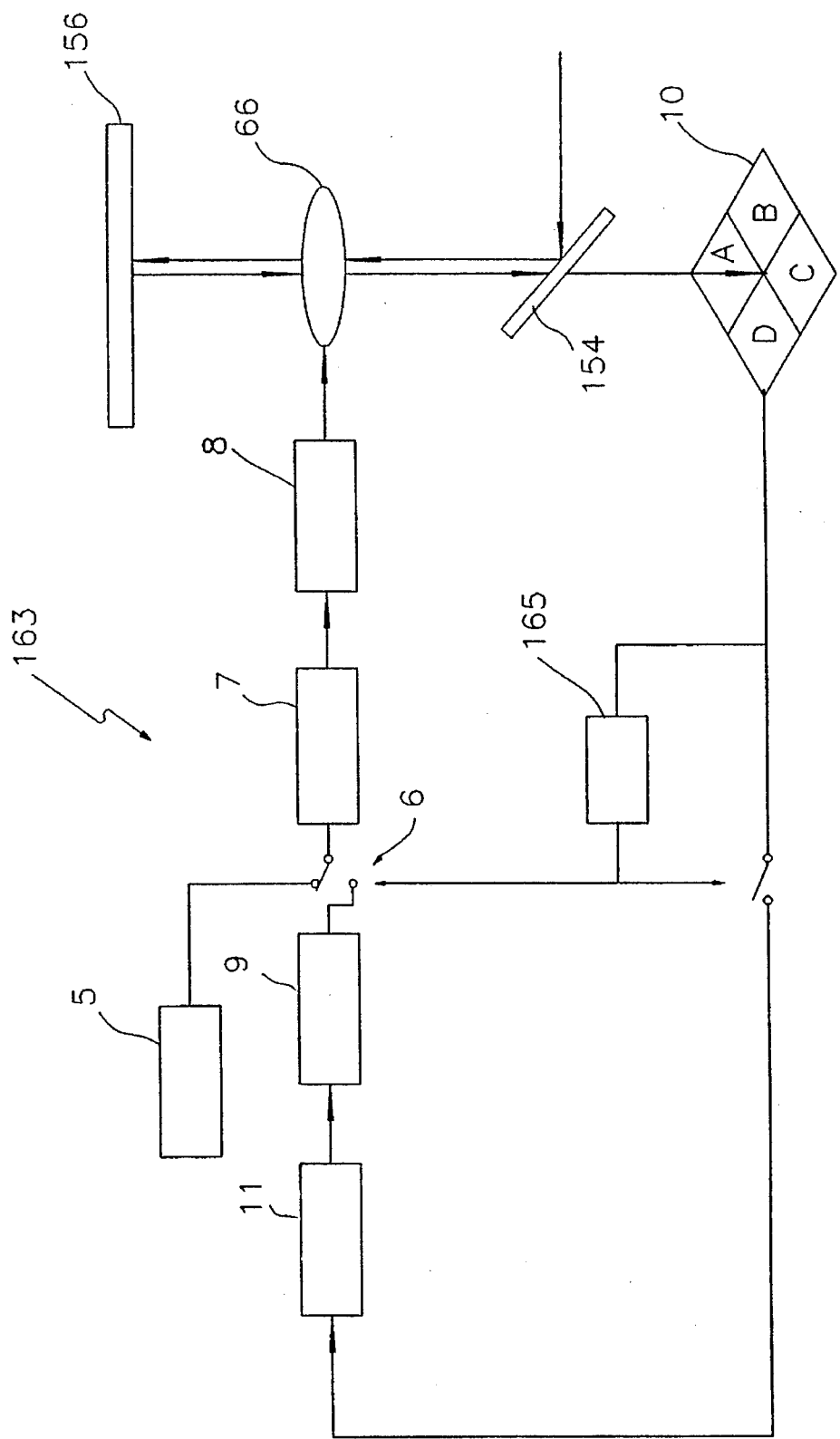
FIG. 2 is a block diagram for illustrating a conventional focus servo circuit for an optical pickup actuator.
Figure 3:
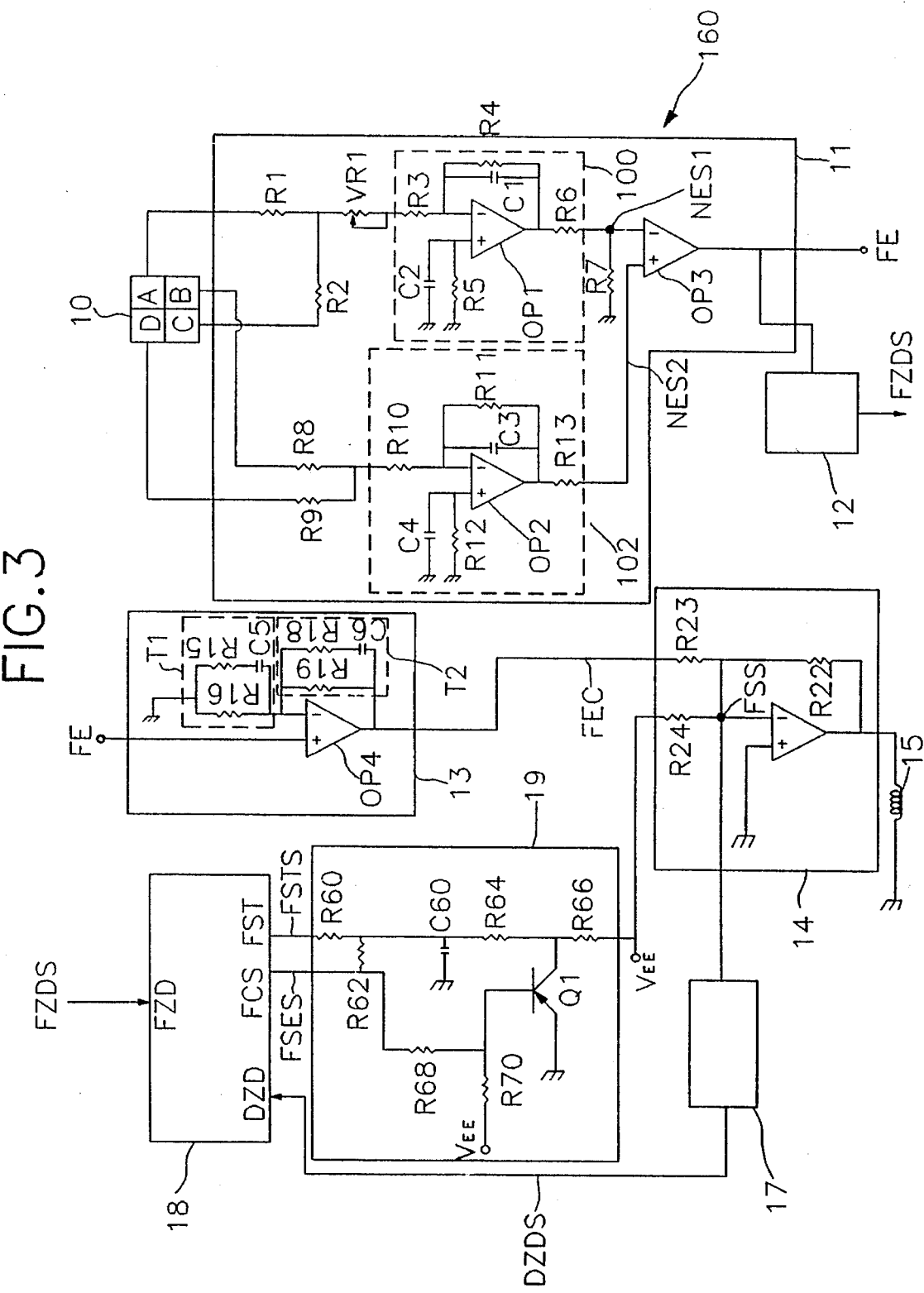
FIG. 3 is a schematic focus servo circuit for an optical pickup actuator according to an embodiment of the present invention.

A flow from a generation of a laser beam to control current outputs for controls of tracking and focusing operations of a servo device is the same as shown in FIG. 1 aforementioned. FIG. 3 is a schematic focus servo circuit for an optical pickup actuator according to an embodiment of the present invention. As shown in FIGS. 1 and 3, a focus servo circuit 160 for an optical pickup actuator according to an embodiment of the present invention includes a photo diode 10 having 4 divided regions A, B, C and D receiving a laser beam through an optical disc 156, an objective lens 66 and a half mirror 154. The photo diode 10 outputs electrical signals according to an intensity of the laser beam. Each of the electrical signals is outputted from each of the divided regions A, B, C and D of the photo diode 10.

The electrical signals from the regions A, B, C and D are inputted into a focus error signal detection unit 11 which detects a focus error signal FE in order to detect a focus error of the objective lens 66.

The electrical signals from the regions A and C are inputted into the focus error detection unit 11 through resistors R1 and R2. The electrical signals through the resistors R1 and R2 are summed, adjusted by a variable resistor VR1 and inputted to the inverting terminal of an operational amplifier (OP AMP) OP1 through a resistor R3. A resistor R5 and a capacitor C2, which are connected to each other in parallel, are connected to a non-inverting terminal of the OP AMP OP1. A resistor R6 is connected to an output terminal of the OP AMP OP1. A resistor R4 and a capacitor C1, which are connected to each other in parallel, are connected between the inverting terminal and the output terminal thereof. Resistors R3, R4, R5 and R6, capacitors C1 and C2 and OP AMP OP1 construct a first low pass filter (LPF) 100.

The electrical signals from the regions B and D are inputted into the focus error detection unit 11 through resistors R8 and R9. The electrical signals through the resistors R8 and R9 are summed and inputted to the inverting terminal of an operational amplifier (OP AMP) OP2 through a resistor R10. A resistor R12 and a capacitor C4, which are connected to each other in parallel, are connected to a non-inverting terminal of the OP AMP OP2. A resistor R13 is connected to an output terminal of the OP AMP OP2. A resistor R11 and a capacitor C3, which are connected to each other in parallel, are connected between the inverting terminal and the output terminal thereof. Resistors R10, R11, R12 and R13, capacitor C3 and C4 and OP AMP OP2 construct a second low pass filter (LPF) 102. The first and second low pass filters 100 and 102 generate noise-free electrical signals NES1 and NES2 respectively with inputs of the electrical signals of regions A and C and the electrical signals of regions B and D. Electrical signal NES1 is divided by a resistor R7 and inputted to the inverting terminal of OP AMP OP3, and electrical signal NES2 is inputted to the non-inverting terminal of OP AMP OP3, so that OP AMP OP3 generates a focus error signal FE.

In the meantime, focus error signal FE is inputted to a phase compensation unit 13 constituted with a phase lead/phase lag circuit in order for focus error signal FE to be compensated for phase thereof. Phase compensation unit 13 includes an OP AMP OP4 of which the non-inverting terminal receives focus error signal FE and the inverting terminal receives an output of a tank circuit T1 being constructed with a resistor R16 in parallel with a resistor R15 and a capacitor C5. Resistor R15 and Capacitor C5 are connected in series to each other. And a tank circuit T2 is connected between the output terminal of OP AMP OP4 and the inverting terminal. Tank circuit T2 is constructed with a resistor R19 which is in parallel connected with a resistor R18 and a capacitor C6 connected in parallel to each other.

A phase-compensated focus error signal FEC is generated from the output terminal of OP AMP OP4 of phase compensation unit 13. Phase-compensated focus error signal FEC is applied to a focus servo drive unit 14. As shown in FIG. 3, focus servo drive unit 14 includes an OP AMP OP5 of which the output terminal is connected to a focusing coil 15 and the inverting terminal is connected to a resistor R23 and a resistor R24 to input phase-compensated focus error signal FEC and a focus servo drive signal FSS, which will be described later, therethrough and of which the non-inverting terminal is grounded. A resistor R22 is connected between the inverting terminal and the output terminal of OP AMP OP5.

Figure 4:
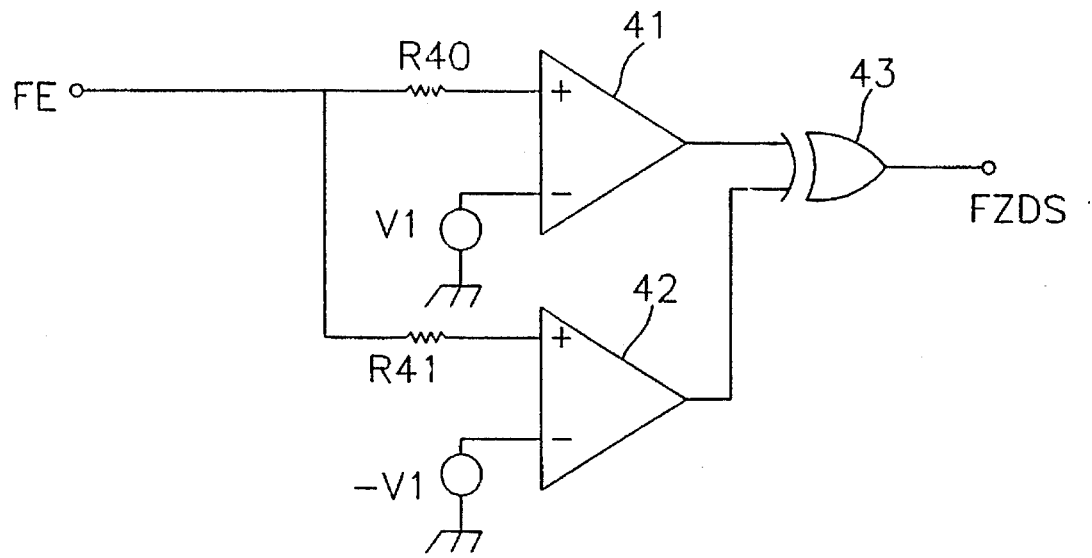
FIG. 4 is a detailed circuit for a focus zero detection unit of FIG. 3 for detecting a predetermined section of a focus error signal.

As shown in FIG. 4, a focus zero detection unit 12 includes an OP AMP 41 of which the non-inverting terminal inputs focus error signal FE through a resistor R40 and the inverting terminal inputs 5 volts, for example, from a first reference voltage source V1, an OP AMP 42 of which the non-inverting terminal inputs focus error signal FE through a resistor R41 and the inverting terminal inputs −5 volts, for example, from a second reference voltage source −V1, and an exclusive OR gate 43 which inputs outputs of OP AMPs 41 and 42 for an exclusive OR connection thereof. Focus zero detection unit 12 detects a predetermined section of focus error signal FE.

Focus zero detection unit 12 outputs a low level signal ("0") FZDS when a predetermined section of focus error signal FE is detected.

Focus servo drive signal FSS is inputted to a drive signal zero detection unit 17.

Figure 5:
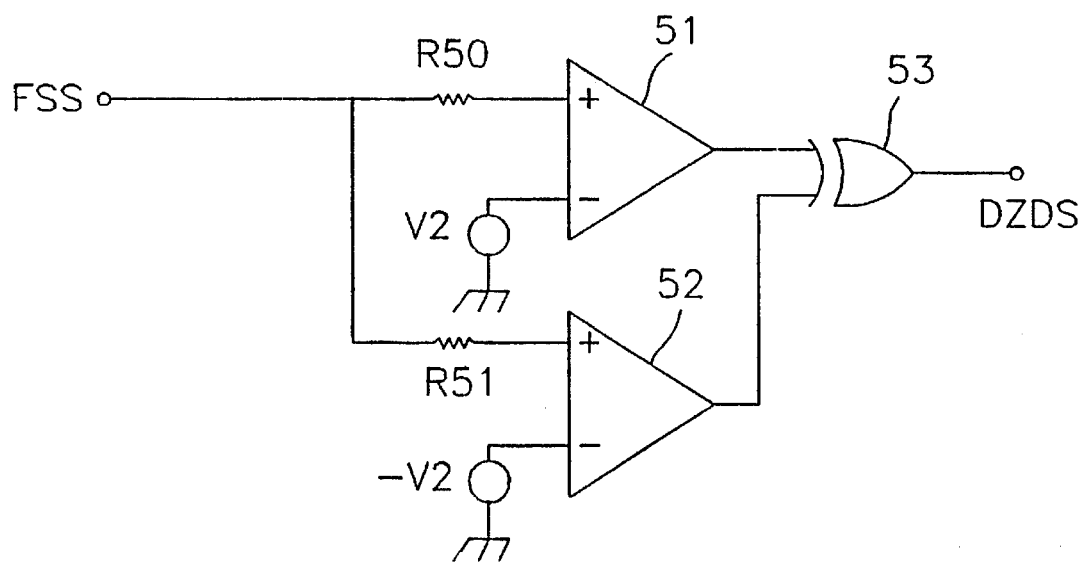
FIG. 5 is a detailed circuit for a drive signal zero detection unit of FIG. 3 for detecting a predetermined section of a focus servo drive signal.

As shown in FIG. 5, drive signal zero detection unit 17 includes an OP AMP 51 of which the non-inverting terminal inputs focus servo drive signal FSS through a resistor R50 and the inverting terminal inputs 5 volts, for example, from a third reference voltage source V2, an OP AMP OP 52 of which the non-inverting terminal inputs focus servo drive signal FSS through a resistor R51 and the inverting terminal inputs −5 volts, for example, a fourth reference voltage source −V2, and an exclusive OR gate 53 which inputs outputs of OP AMPs 51 and 52 for an exclusive OR connection thereof.

Drive signal zero detection unit 17 outputs a low level signal ("0") DZDS when a predetermined section of focus servo drive signal FSS is detected.

Low level signals FZDS and DZDS are respectively inputted to terminals FZD and DZD of a microprocessor 18. Microprocessor 18 outputs a focus start signal FSTS to a switching unit 19 through terminals FST and FCS thereof for starting a normal focus servo operation. Switching unit 19 includes a transistor Q1, the collector electrode of transistor Q1 is connected to the inverting terminal of focus servo drive unit 14 through a resistor R66, resistors R60 and R64 in series are connected to resistor R66 in series and resistor R60 is connected to terminal FST of microprocessor 18, the base electrode of transistor Q1 is connected to a terminal FCS of microprocessor 18 through a resistor R68, a voltage source $V_{EE}$ is connected to the base electrode of transistor Q1 through a resistor R70 which is connected between a resistor R68 and the base electrode of transistor Q1, one end of a resistor R62 is connected between resistor R60 and capacitor C60 and the other end of resistor R62 is connected between terminal FCS of microprocessor 18 and resistor R68.

The emitter electrode of transistor Q1 is grounded.

Operations of the focus servo circuit for an optical pickup actuator having the above construction will be described in detail below.

Figure 6:
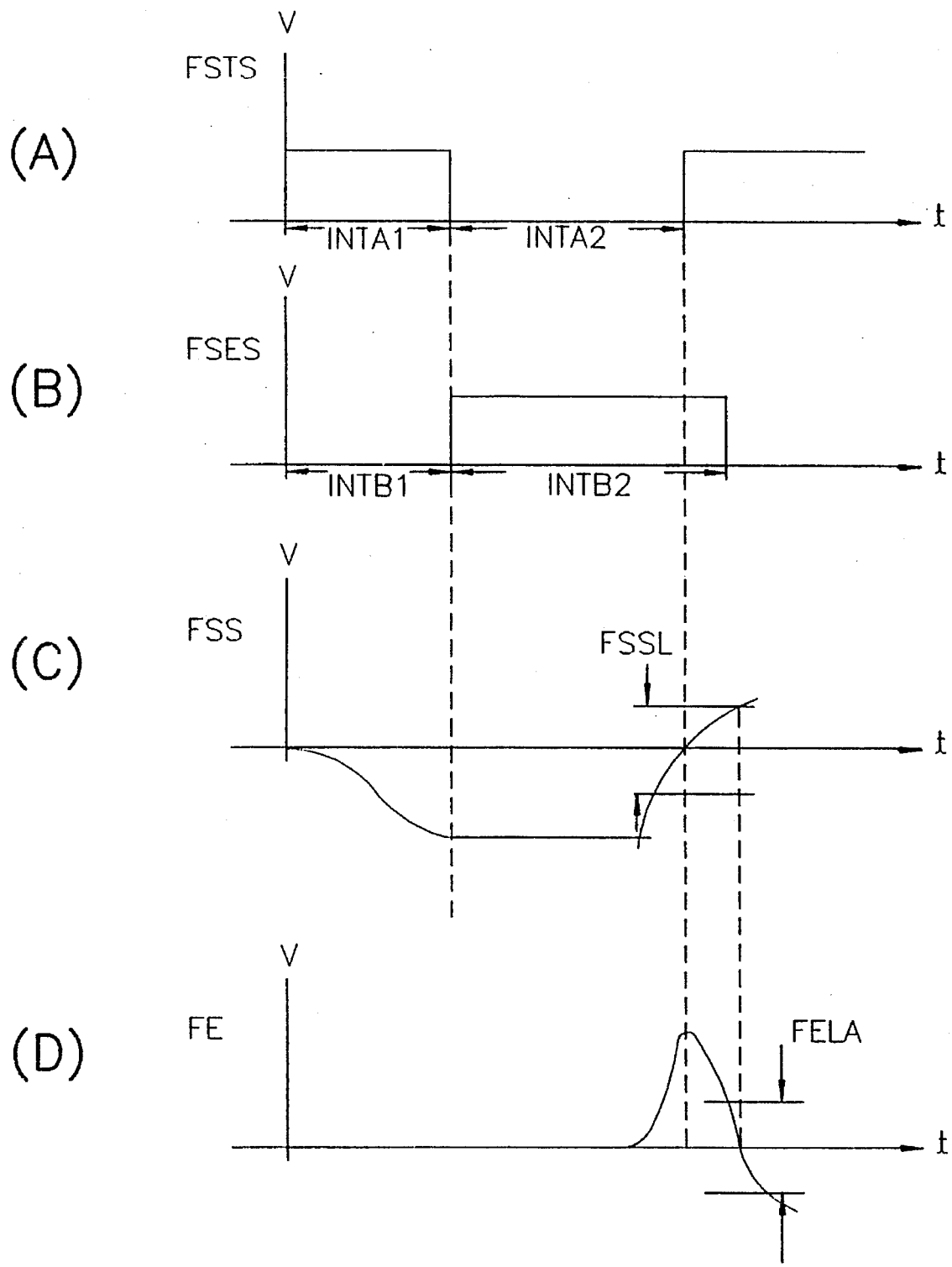
FIG. 6(a–d) are views for illustrating waveforms for explaining a focus servo start in a focus servo circuit of FIG. 3.

FIG. 6 is a view for illustrating waveforms for explaining a focus servo start in a focus servo circuit of FIG. 3.

First of all, microprocessor 18 outputs to switching unit 19 focus start signal FSTS and focus start enable signal FSES from respective terminals FST and FCS thereof, as shown in (A) and (B) of FIG. 6. When microprocessor 18 outputs a first section INTA1 of focus start signal FSTS and a first section INTB1 of focus start enable signal FSES, transistor Q1 of switching unit 19 is turned on thereby charging capacitor C60 by focus start signal FSTS. And then capacitor C60 is discharged through resistor R62 with transistor Q1 turned off when microprocessor 18 outputs a second section INTA2 of focus start signal FSTS and a second section INTB2 of focus start enable signal FSES. With capacitor C60 charging and discharging as above mentioned, focus servo drive signal FSS, which is applied to the inverting terminal of OP AMP OP5 in focus servo drive unit 14, has a waveform as shown in (C) of FIG. 6. Focus servo drive signal FSS is inverted for an output of OP AMP OP5. The output of OP AMP OP5 causes objective lens 66 to move up and down. The up-and-down movements of objective lens 66 causes photo diode 10 to output focus error signal FE as shown in (D) of FIG. 6.

Focus error signal FE and focus servo drive signal FSS are applied to focus zero detection unit 12 and drive signal zero detection unit 17 respectively.

Focus error signal FE is compared with first reference voltage source V1 and second reference voltage source −V1 in OP AMP 41 and OP AMP 42 of focus zero detection unit 12 respectively so that a high level signal ("1") or a low level signal ("0") is respectively generated therefrom. The outputs of OP AMP 41 and OP AMP 42 are applied to exclusive OR gate 43. Exclusive OR gate 43 generates low level signal ("0") in a predetermined section FELA, as shown in (D) of FIG. 6, of focus error signal FE. Actually, predetermined section FELA is a portion of an S-curve of focus error signal FE, and the S-curve is well-known to those skilled in the art as the portion of focus error signal FE which is outputted in a linear relationship with displacements of the optical pickup actuator. Therefore, predetermined section FELA is a section that stably ensures a linear relationship in an output of focus error signal FE according to the up-and-down displacements of the optical pickup actuator.

In the same manner as mentioned above, Focus servo drive signal FSS is compared with third reference voltage source V2 and fourth reference voltage source −V2 in OP AMP 51 and OP AMP 52 of drive signal zero detection unit 17 respectively so that a high level signal ("1") or a low level signal ("0") is respectively generated therefrom. The outputs of OP AMP 51 and OP AMP 52 are applied to exclusive OR gate 53. Exclusive OR gate 53 generates low level signal ("0") in a predetermined section FSSL, as shown in (C) of FIG. 6, of focus servo drive signal FSS. Actually, predetermined section FSSL is a portion of focus servo drive signal FSS, and the portion ensures stable and linear displacements of the optical pickup actuator when starting a focus servo. Therefore, predetermined section FSSL is a section that stably secures a linear relationship between focus servo drive signal FSS and the displacements of the optical pickup actuator. Outputs of focus zero detection unit 12 and drive signal zero detection unit 17 are respectively applied to terminals FZD and DZD of microprocessor 18. When all the outputs of units 12 and 17 are "0", microprocessor 18 generates focus start enable signal FSES of a low level ("0") at terminal FCS thereof. Accordingly, transistor Q1 of switching unit 19 is turned on so that focus start signal FSTS is applied to focus servo drive unit 14. Therefore, a normal focusing operation is performed.

As mentioned above, the focus servo circuit for an optical pickup actuator enables accurate and fast focus servo to be performed since the predetermined sections of the focus error signal and focus servo drive signal are simultaneously referred together to control the focus servo.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A focus servo circuit for an optical pickup actuator comprising:

a control unit for outputting a focus start signal and a focus start enable signal;

a focus error detection unit for generating a focus error signal in accordance with a focus error of an objective lens of the optical pickup actuator;

a compensation unit for outputting a phase-compensated focus error signal in compensation of the focus error signal;

a focus servo drive unit for generating a focus servo drive signal so as to perform a focusing operation with inputs of the phase-compensated focus error signal, focus start signal and focus start enable signal;

a focus zero detection unit for generating a focus zero detection signal to the control unit with a detection of a predetermined section including a zero crossing from the focus error signal, wherein the predetermined section of the focus error signal is a section that stably ensures a linear relationship in an output of the focus error signal according to the up-and-down displacement of the optical pickup actuator;

a drive signal zero detection unit for generating a focus servo drive zero detection signal to the control unit with a detection of a predetermined section including a zero crossing from the focus servo drive signal, wherein the predetermined section of the focus servo drive signal is a section that stably secures a linear relationship between the focus servo drive signal and the displacements of the optical pickup actuator; and means for controlling the focus start enable signal and focus start signal thereby to start a focus servo of the optical pickup actuator with reference to both the focus zero detection signal and the focus servo drive zero detection signal.

2. The focus servo circuit as claimed in claim 1, wherein the focus zero detection unit includes:

a positive voltage limiting unit for limiting a positive reference voltage of the focus error signal;

a negative voltage limiting unit for limiting a negative reference voltage of the focus error signal; and means for determining whether the focus error signal is within the positive reference voltage and the negative reference voltage with inputs of the outputs of the positive voltage limiting unit and the negative voltage limiting unit.

3. The focus servo circuit as claimed in claim 1, wherein the drive signal zero detection unit includes:

a positive voltage limiting unit for limiting a positive reference voltage of the focus servo drive signal;

a negative voltage limiting unit for limiting a negative reference voltage of the focus servo drive signal; and means for determining whether the focus servo drive signal is within the positive reference voltage and the negative reference voltage with inputs of the outputs of the positive voltage limiting unit and the negative voltage limiting unit.

* * * * *